W. E. SANDHAM.
TIRE AIR PRESSURE GAGE.
APPLICATION FILED APR. 2, 1909.
948,526.
Patented Feb. 8, 1910.
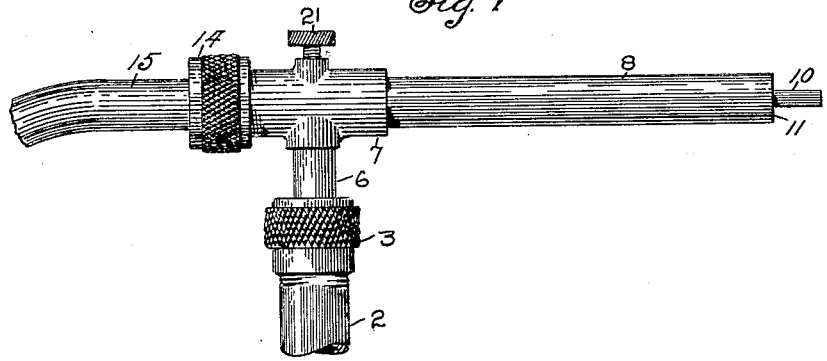
Fig. 1
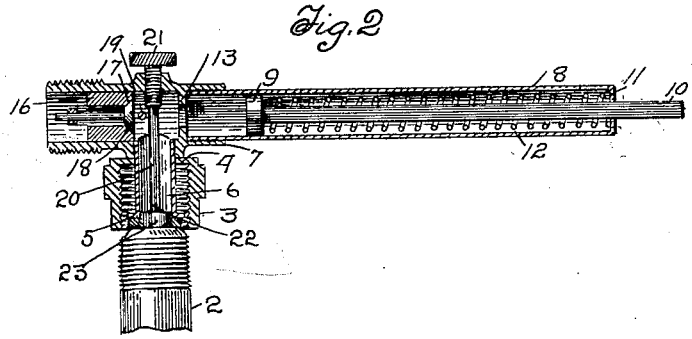
Fig. 2
Fig. 3
Witnesses
Robert P. Northam.
Harry L. Leathers
Fig. 4
Inventor
Walter E. Sandham
By
Attorneys

UNITED STATES PATENT OFFICE.

WALTER E. SANDHAM, OF PASADENA, CALIFORNIA, ASSIGNOR, BY MESNE ASSIGN-MENTS, TO NORTHAM AUTO PRESSURE GAUGE CO., OF LOS ANGELES, CALIFORNIA, A CORPORATION OF CALIFORNIA.

TIRE AIR-PRESSURE GAGE.

948,526.   Specification of Letters Patent.   Patented Feb. 8, 1910.

Application filed April 2, 1909. Serial No. 487,585.

*To all whom it may concern:*

Be it known that I, WALTER E. SANDHAM, a citizen of the United States, residing at Pasadena, in the county of Los Angeles, State of California, have invented a certain new and useful Tire Air-Pressure Gage; and I do hereby declare the following to be a full, clear, and exact description of the invention, such as will enable others skilled in the art to which it appertains to make and use the same.

This invention relates to air pressure gage, more particularly to a device of this class that may be used to indicate the amount of air pressure in a vehicle tire, either while the latter is being inflated, or it may be used independently of the inflating means.

It consists substantially of means for indicating pressure, in conjunction with a tire valve release, a valved air-pump connection, and means whereby the device may be coupled to a tire valve tube, the latter means permitting of the device being used without being coupled to the valve tube.

The object of the invention is to provide a device such as set forth, that is simple and compact in construction, cheap to manufacture, not liable to derangement, effective in action, and neat in appearance.

Further objects and the advantages of the invention will be apparent to those skilled in the art from a consideration of the following description of one form of construction, in which the invention may be embodied, reference being had to the accompanying drawings, in which—

Figure 1 is an elevation of the device, showing it in use during process of tire inflation; Fig. 2 is a central longitudinal vertical section, showing the device used to indicate only; Fig. 3 is a perspective detail of a portion of the indicating means, and Fig. 4 is a perspective of the valve cage.

The device may be coupled to the tire valve tube 2 by knurled nut 3, which is adapted to screw thereon. The upper part of nut 3 (Fig. 2) has an internal flange 4 which in the position of the parts as shown in Fig. 1, rests on a shoulder 5 on the lower end of tube 6 attached to the shell 7 of the device. A ring 6ª of yielding material, preferably rubber, is inserted in the end of tube 6. Shell 7 has a bore at substantially a right angle to tube 6 and one of its threaded ends receives a tube 8. Within tube 8 slides a piston 9 having a stem 10 passing out of a suitably formed hole in the head 11 of the tube and bearing indicating characters on its flattened faces, as shown in Fig. 3. A spring 12 interposed between piston 9 and head 11, tends to force the former toward the shell 7. Within shell 7, contiguous to tube 8, is a diaphragm 13 limiting the inward movement of piston 9. The end of shell 7 remote from tube 8 is threaded to receive the pump coupling 14 whereby the device may be connected to pump tube 15. The interior of the same end of the shell has inserted therein valve cage 16 which has a valve seat 17, against which rests valve 18. The outward movement of the valve is limited by pin 19 passing through shell 7. A tire valve depressor 20 is arranged within the bore of tube 6 and has a threaded portion thereof passing through shell 7. A knurled head 21 upon its upper end permits the depressor being rotated to raise or lower its point 22, to bring it into or out of contact with the tire valve stem 23.

The manner of use of the device may be as follows: As shown in Fig. 1, when it is desired to make use of the device during the process of tire inflation, the knurled nut 3 is screwed upon the tire valve tube 2, and tire valve depressor 20 is operated to depress the tire valve stem 23. The pump being operated, air passes through tube 15, through valve cage 16, and downwardly through tube 6 to tire valve tube 2; reflux of the air being prevented by valve 18. As the inflation of the tire progresses, the pressure within shell 7 and tube 8 forces piston 9 outwardly, and stem 10 is pushed out beyond the head 11, the characters on the stem indicating the pressure within the tube, as will be understood. When it is merely desired to ascertain the pressure within a tire already inflated, the lower end of tube 6 is pressed against the end of the valve tube 2, nut 3 sliding upwardly on the tube to permit of ring 6ª contacting with the end of tube 2. Valve depressor 20 being moved downwardly in contact with tire valve stem 23, air flows from tire valve tube 2 to shell 7 and tube 8, protruding stem 10 as previously described. It will be understood that the tire valve depressor 20 may normally be in its lowered position, if desired.

While one form of apparatus in which the invention may be embodied has been illustrated and described, it is obvious that various modifications and changes may be made, and the right is reserved to all such changes and modifications as do not depart from the spirit and scope of the invention.

I claim:

1. In a device of the class specified, the combination with a shell adapted for connecting to an air pump, of a tube threaded thereon, a piston within said tube having a stem with indicating characters thereon, a spring interposed between the head of said tube and said piston, a valve in said shell preventing reflux of air, a second tube on said shell having a shoulder on the lower end thereof, a nut on said second tube having an internal flange, and a tire valve depressor in said second tube, substantially as described.

2. A device of the class specified, comprising a shell adapted for connecting to an air pump, a tube connected therewith, a piston within said tube having a stem with indicating characters thereon, a spring interposed between the head of said tube and said piston, a valve within said shell, a tire valve tube coupling connected with said shell, and a tire valve depressor in said coupling.

3. A device of the class specified, comprising a shell adapted for connection to an air pump, a tube connected therewith, a piston within said tube having a stem with indicating characters thereon, a spring interposed between the head of said tube and said piston, a valve within the shell, a tire valve tube coupling associated with said shell, said coupling comprising a tube and a threaded nut slidable and rotatable thereupon, a flange upon said nut, a flange upon said tube, said flanges adapted to engage each other, and a movable tire valve depressor in said coupling, substantially as described.

In testimony whereof, I have signed my name to this specification in the presence of two subscribing witnesses at Los Angeles county of Los Angeles, State of California, this 26th day of March A. D. 1909.

WALTER E. SANDHAM.

Witnesses:
ROBERT J. NORTHAM,
ALEX. H. LIDDERS.